Feb. 8, 1955.  J. R. PARSONS  2,701,843
FREQUENCY CONTROL
Filed April 28, 1951  3 Sheets-Sheet 2

WITNESSES:

INVENTOR
John R. Parsons.
BY
ATTORNEY

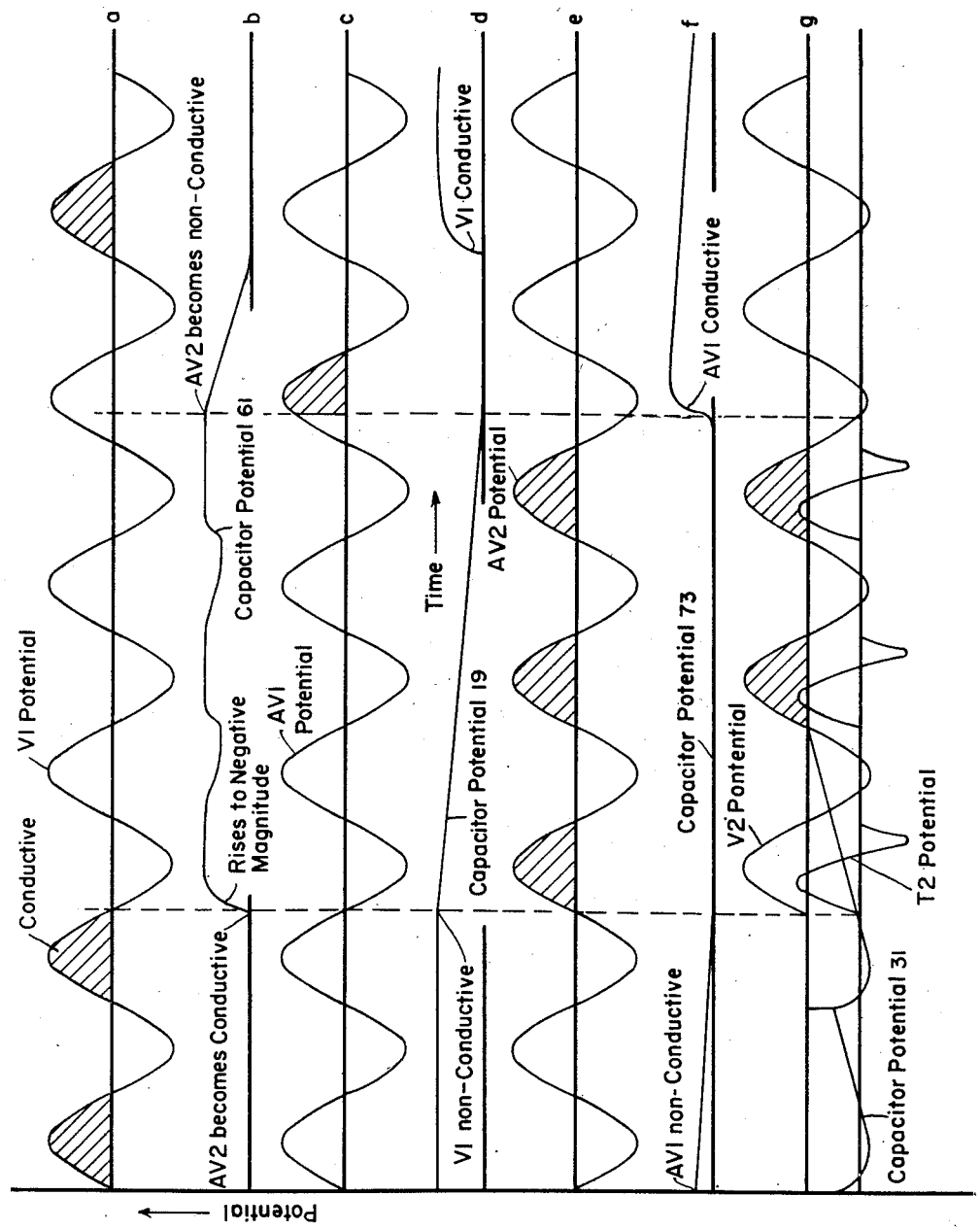

United States Patent Office 2,701,843
Patented Feb. 8, 1955

2,701,843

FREQUENCY CONTROL

John R. Parsons, Kenmore, N. Y., assignor to Westinghouse Electric Corporation, East Pittsburgh, Pa., a corporation of Pennsylvania Application April 28, 1951, Serial No. 223,524

12 Claims. (Cl. 307—151)

My invention relates to electric discharge apparatus and has particular relation to control apparatus for low frequency welding systems.

In its specific aspects, the present application is directed to an improvement over the invention disclosed in application Serial No. 185,068, filed September 15, 1950, to John R. Parsons and Herbert W. Van Ness, and assigned to the Westinghouse Electric Corporation. The latter application relates to a control circuit for a low frequency welder, which is on the whole satisfactory. However, I have found that in seam welders including this circuit the welds produced are at times not uniformly spaced.

It is accordingly a specific object of my invention to provide a control circuit for a low frequency welder which shall operate in such manner that uniformly spaced welds shall be produced.

Another object of my invention is to provide control apparatus for a low frequency welder which shall cooperate with the welder to produce uniformly spaced welds.

A further object of my invention is to provide a frequency determining network of simple and inexpensive structure for a low frequency welder.

A still further object of my invention is to provide a frequency determining network having few adjustable controls for a low frequency welder.

An ancillary object of my invention is to provide a novel circuit including an electric discharge valve.

My invention arises from the realization that the unequal spacing of seam welds produced with the control circuit disclosed in the above-mentioned copending application is caused by the manner in which the welding pulses are initiated, that is, from the manner in which the respective ignitrons which conduct the welding transformer currents of the opposite polarities are rendered conductive. This initiation is effected by pulses derived from a transformer (63, Fig. 1 of copending application) having a pair of secondaries. The primary (61) of this transformer conducts current only during alternate half periods of the supply. For each half period pulse conducted by the primary, a positive and negative potential pulse is induced in each of the secondaries. One of the secondaries is effective when the positive pulse appears on it to cause the timer to deliver a pulse for firing the ignitrons which conduct current of one polarity through the welding transformer; the other secondary is effective when the negative pulse appears on it to produce the timing pulses to fire the ignitrons which conduct the current of the opposite polarity. I have found that because of this difference in polarity of the pulses which initiate the timing pulses there is a longer delay between the termination of the current flow of the first polarity through the welding transformer and the initiation of the current flow of the second polarity, than between the termination of the current flow of the second polarity and the subsequent initiation of the current flow of the first polarity. This condition arises particularly when the control circuit is set for the minimum interval between opposite-polarity pulses; that is, the highest welding speed available.

In seam welding the material moves as it is welded and, at the highest speeds, each low-frequency half wave produces a single weld. Since the successive quiescent intervals intervening between three successive pulses are of different duration, the material to be welded travels a different distance between the first of the three pulses and the second than between the second and the third and spacing between the corresponding welds is different.

In accordance with my invention, I provide a frequency determining system in which time intervals of equal duration are positively interposed between the last of a series of pulses which cause firing the ignitrons conducting current of one polarity and the first of a series of pulses which cause firing the ignitrons conducting the current of the opposite polarity. Following the firing of the last ignitron to conduct for each polarity, current is conducted for a time interval of a predetermined magnitude and the system is then quiescent for another time interval of predetermined magnitude, both magnitudes being substantially the same on each occurrence. The distance moved by the metal during quiescent intervals is then the same and the spacing between seam welds is equal.

In accordance with the specific aspects of my invention, the pulses for initiating the load current of one polarity are derived from a pulse producing network, the output component of which is a transformer having a pair of secondaries. From one of these secondaries, the timing pulses are derived. The other secondary supplies a blocking potential which prevents the supply of the timing pulses that produce the load current of the opposite polarity so long as the first timing pulses are supplied and for a predetermined time interval thereafter. The decay of this blocking potential positively fixes the interval between the transmission through the load of the current of the first polarity and the transmission through the load of the current of the opposite polarity.

The supply of the pulses which initiate the current flow of the first polarity also conditions an auxiliary pulse producing network to supply auxiliary pulses a predetermined time interval after the initiation of the supply of the conditioning pulses. These auxiliary pulses interrupt the supply of the conditioning pulses and at the predetermined time interval thereafter, as determined by the decay of the blocking potential, initiate the flow of what may be called the main pulses which produce the load current of the opposite polarity. The auxiliary pulses flow and produce the opposite polarity main pulses only during a predetermined time interval as preset by a timing network. At the end of this time interval they are interrupted, and then, after a time interval which may be positively set by a timing network, the flow of the main pulses, which produce the current of the first polarity, is again initiated. The time intervals between the instants when the load current of the first polarity is interrupted and load current of the opposite polarity is initiated and the instant when the load current of the opposite polarity is interrupted and the load current of the original polarity is initiated may be set by properly adjusting the timing networks which delay the supply of the pulses producing the load currents of the two polarities.

The frequency determining system according to my invention is supplied from a single phase of the polyphase supply from which the welding power is derived. The timing pulses flow during selected half periods of the supply. Each main pulse flowing during its corresponding half period of the supply causes load current to flow during three intervals, each equal to one-third of a period of the supply. Each main timing pulse thus produces load current during a full period of the supply. The main pulses for load current of one polarity produce auxiliary pulses which are supplied during the intervals between main pulses and while the pulses of the opposite polarity are provided, one auxiliary pulse being supplied for each main pulse. The main pulse networks are connected in opposite phase to the single phase of the supply from which they derive their power; the auxiliary pulse network is connected in phase with the opposite polarity pulse network and auxiliary pulses flow at the same time as main pulses. An auxiliary pulse flowing during one half period provides blocking potential which by proper rating of a timing network persists sufficiently long to prevent the main-pulse network of the first polarity from supplying a pulse during the immediately following half period.

Since the timing pulses preferably are produced by rendering conductive thyratrons, a timing pulse cannot be interrupted while it is flowing. However, the blocking potential necessary to interrupt the pulse by maintaining the corresponding thyratron non-conductive may reach the blocking magnitude, by reason of conduction elsewhere in the circuit, during the half period following one during which a pulse is flowing. The flow of auxiliary pulses may thus be interrupted during one of these non-conductive half periods. Under such circumstances, auxiliary pulses do not flow during the succeeding half period of the supply and do not produce the main pulses of the opposite polarity. On the other hand, the discontinuance of the flow of the auxiliary pulses conditions the main pulse network of the first polarity to supply the latter main pulses during the half periods during which the potential supplied to this main pulse network is of the proper polarity, but not during the half period immediately following the supply of the last auxiliary pulse. At least 1½ periods thus elapse between the initiation of the last auxiliary pulse and the initiation of a main pulse of the first polarity. One period of this 1½ period interval is taken by conduction of load current of the opposite polarity, during the remaining half period the system is quiescent. There is then, in effect, a minimum gap of ½ period between the flow of current of the opposite polarity and the flow of current of the first polarity. An equivalent half period gap may be introduced between the interruption of the current of the first polarity and the starting of the current of the opposite polarity by properly setting the timing network which blocks the initiation of the opposite-polarity pulses. Under such circumstances, the system would be set to operate at the highest welding speed.

The novel features that I consider characteristic of my invention are set forth with particularity in the appended claims. The invention itself, however, both as to its organization and its method of operation, together with additional objects and advantages thereof will be understood from the following description of a specific embodiment when read in connection with the accompanying drawings, in which:

Fig. 3 is a graph illustrating the operation of the apparatus shown in Fig. 2.

Figure 1:
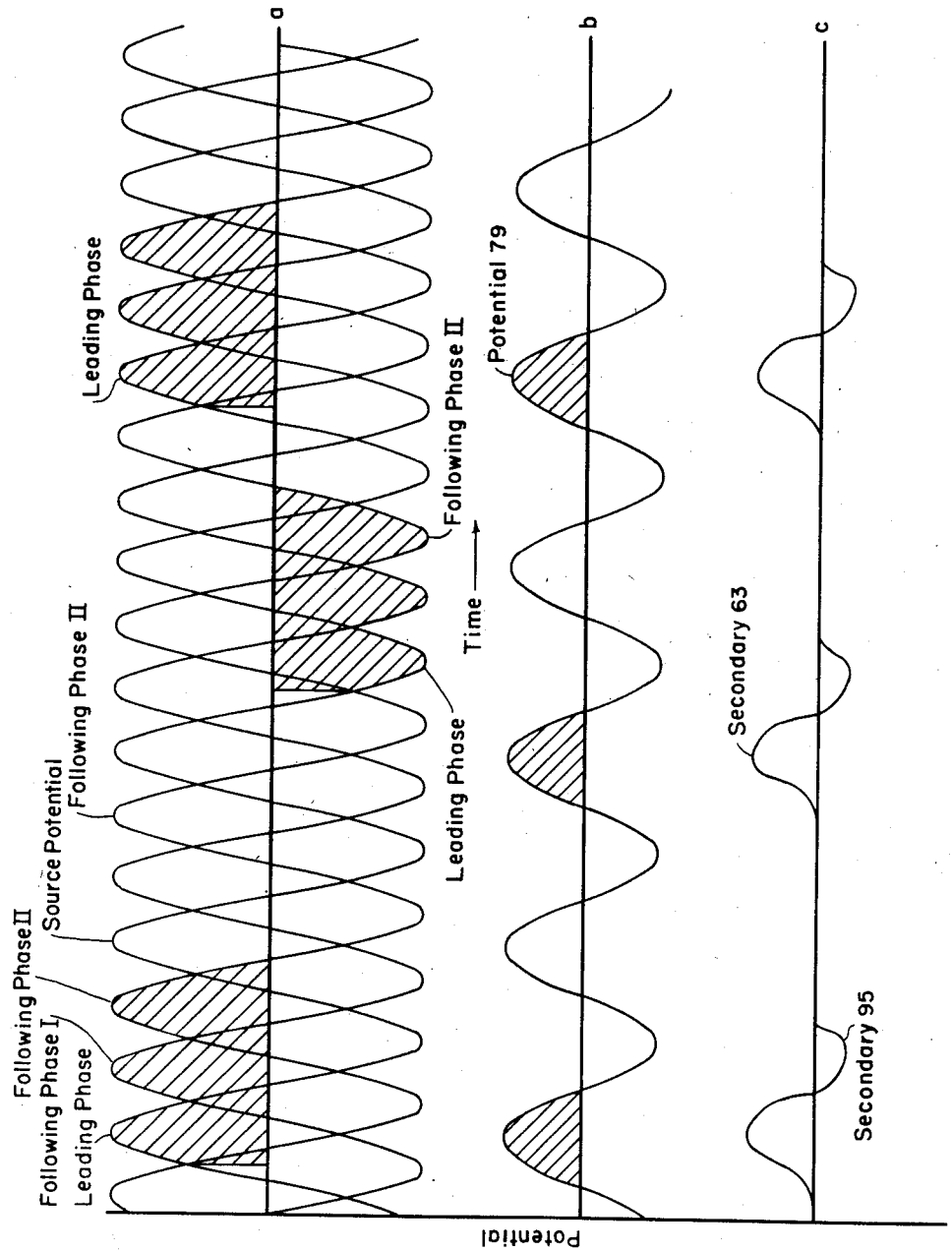
Fig. 1 is a graph illustrating the operation of the apparatus shown in copending application Serial No. 185,068.

In each of the graphs of Fig. 1, potential is plotted vertically and time horizontally. In graph $a$, the potential impressed by the phase conductors of the supply is plotted as a function of time. In graph $b$, the potential impressed on the thyratron 79 of the above-identified copending application, through which the pulses that initiate the load current flow are transmitted, is plotted as a function of time, and in graph $c$, the potential derived from the secondaries 93 and 95 of the transformer 63 supplied through the thyratron 79 is plotted as a function of time. The shaded areas in graph $a$ represent approximately the intervals during which load current is conducted, and the shaded areas of graph $b$ represent the intervals during which the thyratron 79 is conductive. The graphs represent operation of a system set so that during each low frequency half period of the supply current is conducted only once from each pair of phase buses of the supply.

As is illustrated in Fig. 1, load current of one polarity is initiated by the positive loop of the secondary potential derived from the transformer 63. This load current flows from each of the phases of the supply in succession. Thereafter, the flow of load current is discontinued. The flow of load current of the opposite polarity is then initiated by the negative loop of the secondary output of transformer 63 when the corresponding phase potential for the leading phase to conduct is of the proper polarity. Consideration of graph $a$ reveals that this event occurs approximately one and one-half periods after the potential of following-phase II has passed through zero. Current of the oposite polarity is now conducted through the load from each of the phases of the supply in succession. Thereafter, the current flow is discontinued, and current flow of the initial polarity is again started, by a positive loop of the secondary potential derived from the transformer 63 when the potential of the leading phase is again of the proper polarity. This latter event occurs only one half period after following-phase II of the last polarity has passed through zero. Thus, the time intervals between the termination of load current of one polarity and the initiating current of the opposite polarity and between the termination of the current flow of the last polarity and the initiation of the current flow of the first polarity are markedly unequal. The corresponding spaces between welds produced by the half-period pulses in a seam welding operation are therefore also of unequal length.

While Fig. 1 illustrates the situation which arises in a system in which load current is supplied during each low frequency interval (half period) during approximately one full period of the supply, the same condition would arise if during each low frequency half period, the load current were conducted during several periods of the supply. The condition, however, arises primarily only in situations where the non-conductive intervals are set at a minimum. These situations are of importance primarily in seam welding where it is desirable that the welds be produced at as high a rate as practicable, and a minimum non-conductive gap is therefore essential.

Figure 2:
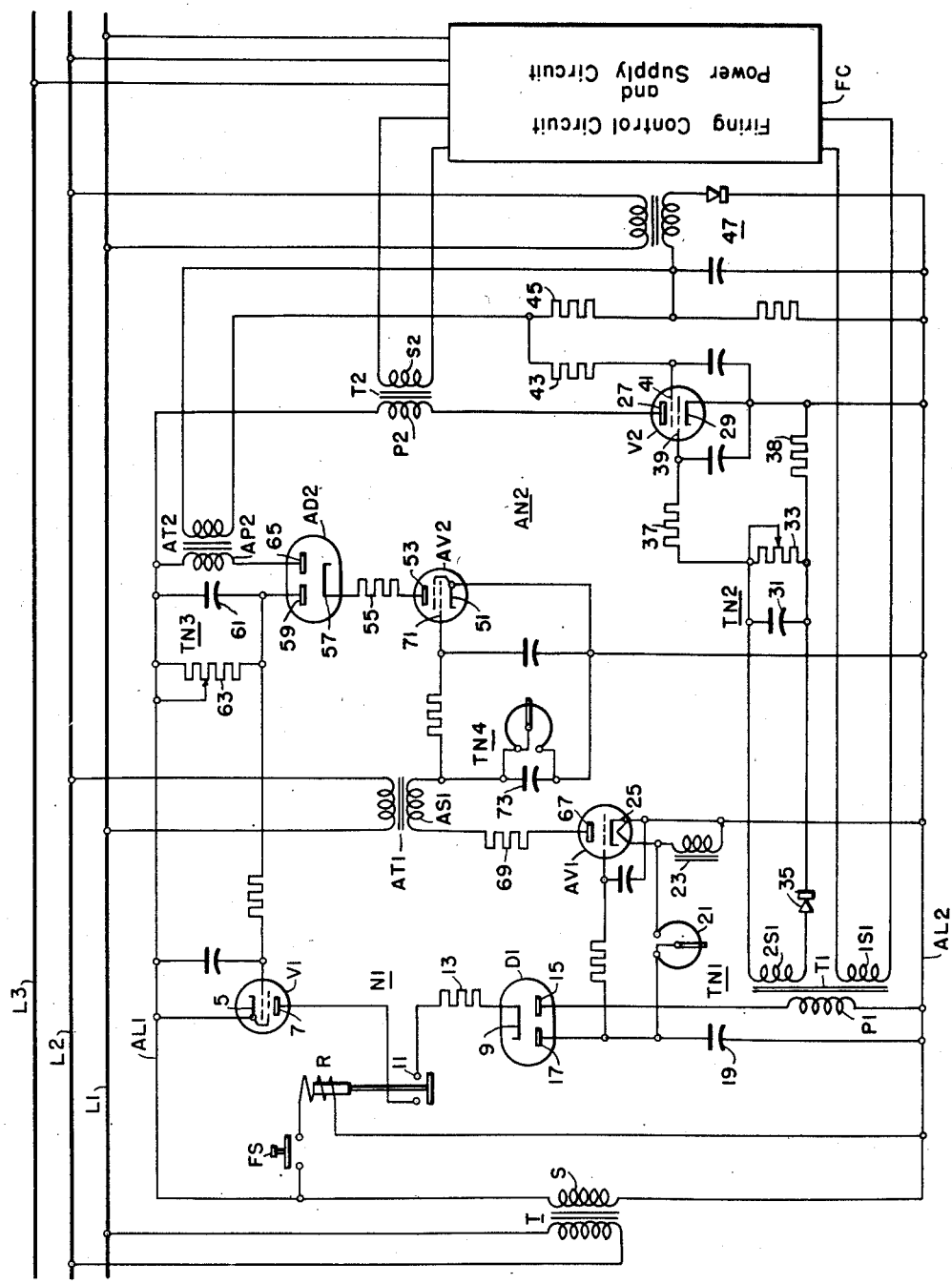
Fig. 2 is a circuit diagram of a preferred embodiment of my invention.

The apparatus shown in Fig. 2 comprises a first network N1 for supplying the pulses which produce the load current of one polarity. This network is supplied from auxiliary buses AL1 and AL2 deriving their power from a secondary S of a transformer T supplied from two of the main power supply buses L1 and L2 of a three-phase system $L_1, L_2, L_3$. The latter two buses L1 and L2 correspond preferably to the buses from which the leading load current is drawn.

The first network includes a thyratron V1, a double diode D1 and the primary P1 of a transformer T1 through which the pulses are supplied. The cathode 5 of the thyratron V1 is connected to one of the auxiliary buses AL1, and the anode 7 is adapted to be connected to the cathode 9 of the diode D1 through normally open contacts 11 of a relay R, and through a resistor 13. One anode 15 of the double diode D1 is connected to the other auxiliary bus AL2 through the primary P1 of the transformer T1. The other anode 17 is connected to the auxiliary bus AL2 through a timing network TN1 including a capacitor 19, a voltage divider 21, and the heating windings 23 of the cathode 25 of an auxiliary thyratron AV1.

Pulses for initiating the load current of the opposite polarity are derived from a second network AN2 which includes a second main thyratron V2. The anode 27 of this thyratron V2 is connected to the upper bus AL1 through the primary P2 of the auxiliary transformer T2 through which the pulses are supplied. The cathode 29 is connected directly to the other bus AL2. The first and second main thyratrons V1 and V2 respectively are thus supplied in opposite phase.

The output transformer T1 of the first network N1 includes a pair of secondaries 1S1 and 2S1. One of these secondaries 1S1 is connected to supply pulses to a firing-control circuit FC of the type shown in Fig. 2 of application Serial No. 52,105, filed September 30, 1948, now Patent #2,508,467 to John R. Parsons and Edward C. Hartwig, and assigned to the Westinghouse Electric Corporation. This connection is effected in the same manner as the connection of the secondary 143 of the output transformer 127, for example, of the application Serial No. 185,068. Accordingly, the output of secondary 1S1 may supply the input to a thyratron of the firing control circuit to condition it to become conductive and supply firing impulses to firing thyratrons. The other secondary 2S1 of the output transformer T1 is connected across a timing network TN2 consisting of a capacitor 31 and a variable resistor 33 through a rectifier 35. The network TN2 is connected through the usual impedances 37 and 38 between the control electrode 39 and the cathode 29 of the second main thyratron V2. The rectifier 35 is so interposed in the connections between the secondary 2S1 and the network TN2 that when potential is impressed across the secondary, the capacitor 31 is charged in such a sense as to tend to maintain the second thyratron non-conductive.

The other output transformer T2 has only only secondary S2 which is connected to the firing control circuit FC, such as is shown in Fig. 2 of application Serial No. 52,105, now Patent No. 2,508,467 in a manner corresponding to the connection of the secondary 141 of transformer 125 of the application Serial No. 185,068.

The second main thyratron V2 has a control electrode 41 in addition to the one 39 to which the timing network TN2 is connected. This control electrode is connected to the cathode 29 through a pair of resistors 43 and 45 and a bias 47. The bias is of such polarity as to tend to maintain this thyratron V2 non-conductive. The bias may be counteracted by auxiliary pulses derived from an auxiliary network AN2 and supplied across one of the resistors 45 connected to the bias 47.

The auxiliary network AN2 includes another auxiliary thyratron AV2 and another double diode AD2. The cathode 51 of the thyratron AV2 is connected to the lower auxiliary bus AL2. The anode 53 is connected through an anode resistor 55 to the cathode 57 of the diode AD2. One anode 59 of the diode is connected to the upper auxiliary bus AL1 through a timing network TN3 consisting of a capacitor 61 and a resistor 63. The other anode 65 is connected to the upper bus AL1 through the primary AP2 of a transformer AT2 from which the auxiliary pulses are derived. The timing network TN3 is connected between the control electrode and the cathode of the first main thyratron V1.

The remaining auxiliary thyratron AV1 is supplied from an auxiliary transformer AT1 connected directly to the main buses L1 and L2 which supply the timing network. The secondary AS1 of this transformer is connected at one terminal to the anode 67 of the thyratron through an anode resistor 69 and at the other terminal to the cathode 25 through another timing network TN4. The timing network TN4 is connected between the control electrode 71 and the cathode 51 of the second auxiliary thyratron AV2.

The anode potentials impressed on the first main thyratron V1 and the auxiliary thyratron AV1 are substantially in phase. The anode potentials impressed on the second main thyratron V2 and the second auxiliary thyratron AV2 are also in phase. But, the potentials impressed on the first main thyratron V1 are in opposite phase to the potential impressed on the second main thyratron V2.

A welding operation may be initiated by actuation of a manually actuable switch FS, such as a foot switch, for example. The start relay R is then actuated, closing its normally open contacts 11. On the occurrence of this event, the first main thyratron V1 is rendered conductive when its anode becomes positive, and current flows through its associated network N1. During each half period of the supply during which the bus AL2 is positive and the bus AL1 is negative, a pulse is now delivered to the primary P1 of the output transformer T1. Corresponding pulses are supplied through one of the secondaries 1S1 of this transformer to the firing-control circuit FC and load current of one polarity flows. For each pulse supplied through the transformer, the load current flows during approximately a complete period of the polyphase power supply.

Through the other secondary 2S1 a pulse is delivered to the timing network TN2 in the control circuit of the second main thyratron V2 which tends to maintain the latter non-conductive. This biasing potential initially produces no apparent effect inasmuch as the thyratron is maintained non-conductive by the bias 47 on its other control electrode 41.

The flow of current through the first main thyratron VI also causes the capacitor 19 in its timing network TN1 to charge, immediately impressing a potential to render the first auxiliary thyratron AV1 non-conductive. The capacitor 73 in the timing network TN4 of the latter now discharges, and after a predetermined time interval, the second auxiliary thyratron AV2 is rendered conductive. The capacitor 61 in the timing network TN3 is now charged applying a potential to maintain the first main thyratron non-conductive. Since the anode potential of the auxiliary thyratron AV2 is in opposite phase to the anode potential of the first main thyratron V1, the biasing potential is impressed on the first main thyratron while this thyratron (V1) is non-conductive and prevents the thyratron from becoming conductive during the succeeding half period.

The auxiliary thyratron AV2 also supplies an auxiliary pulse through its associated transformer AT2. This pulse counteracts the bias 47 in the control circuit of the second main thyratron V2 and conditions the latter to conduct. However, the other control electrode 39 is initially biased to non-conductivity by the network TN2 and initially the thyratron V2 remains non-conductive. This condition continues so long as the capacitor 31 is charged to a predetermined potential. With the thyratron V1 non-conductive, the capacitor discharges for a predetermined time interval, and during this interval the system is quiescent, and load current is not supplied. The time interval may be designated the "off time" and may be set by adjusting the resistor 33 in the network TN2. Preferably, this resistor is set so that the time interval is a minimum, that is, of the order of one half period of the supply.

The second main thyratron V2 may now be rendered conductive, and it is rendered conductive during the next half period when the second auxiliary thyratron AV2 is rendered conductive and during succeeding half periods of the same polarity. The second main thyratron V2 now supplies pulses to the firing control circuit FC, and load current flow of the opposite polarity is produced.

When the main thyratron V1 is rendered non-conductive, the capacitor 19 in its timing network TN1 discharges through the associated voltage divider 21. This discharge continues for a predetermined time interval, until voltage impressed in the control circuit of the first auxiliary thyratron AV1 reaches a firing magnitude and the latter is rendered conductive. The capacitor 73 in the timing network TN4 associated with the latter is now charged impressing a blocking potential in the control circuit of the second auxiliary thyratron AV2. This thyratron is then prevented from becoming conductive during its next positive half period. During this half period then an auxiliary pulse is not delivered, and the second main thyratron V2 is not rendered conductive to deliver a pulse to the firing control circuit. The capacitor 61 in the timing network TN3 is moreover discharged.

The system is now again quiescent, and it may be set to remain quiescent for a time interval determined by the time during which the capacitor 61 discharges. This interval may be determined by the magnitude of the rheostat 63 across the capacitor 61. For high speed operation, this rheostat may be so set that the quiescent time interval is only one half period in duration in the same manner as the quiescent half period produced by the other "off timing" network TN2. The first main thyratron V1 then conducts, and the above-described process is repeated. This process continues until the switch FS is opened and relay R deenergizes.

The operation of the apparatus is illustrated in Fig. 3 in each of the graphs of which potential is plotted vertically and time horizontally. In curve 3a, the potential impressed across the first thyratron V1 is plotted as a function of time. The shaded areas represent the conductive half periods of the thyratron. Curve 3b is a plot of the potential on the capacitor 61 in the network TN3 as a function of time. In this curve, negative potential is plotted upward. At the end of the second conductive half period, the negative potential is shown to rise from a zero magnitude to a negative magnitude. At this magnitude, the first thyratron V1 is maintained non-conductive. The rise of the capacitor potential curve corresponds to the instant when the second auxiliary thyratron AV2 is rendered conductive (curve e). Several cycles later, the capacitor potential curve is shown as decaying. It is at this time that the second auxiliary thyratron AV2 becomes non-conductive. The potential is shown as decaying to a low magnitude, and at this point, the first thyratron V1 is again shown as conductive.

In curve 3c, the anode potential of the first auxiliary thyratron AV1 is plotted as a function of time. This thyratron is shown as non-conductive so long as the first thyratron V1 is conductive and for a predetermined time interval thereafter. The time interval is determined by the decay of the potential on the capacitor 19 charged by the first thyratron V1. Curve 3d represents the potential curve for this capacitor. The potential is shown as decaying from a high negative to a predetermined low negative magnitude at which the first auxiliary thyratron AV1 is rendered conductive. This thyratron is rendered conductive as shown at an instant in the half period after the zero instant determined by the potential derived from the heater coil 23; the latter potential is displaced in phase relative to the anode potential by an amount determined by the relationship between the capacitor 19 and the voltage divider 21. This delay is introduced because thyratrons V1 and AV1 are supplied with anode potentials of the same phase and V1 must fire before AV1 when the operation of the system is started by the closing of the switch FS. The delay assures that the thyratrons fire in this succession.

Curve 3e represents the potential of the second auxiliary thyratron AV2. This thyratron conducts a predetermined time interval after the first auxiliary thyratron AV1 becomes non-conductive. The conduction of the thyratron AV2 is, as shown, set to begin immediately following the last half period during which the first thyratron is conductive. This setting does not require fine control of the rheostat 75 through which the capacitor 73 is discharged; the control potential may reach the proper magnitude for firing thyratron AV2 at any time during the half period before the thyratron is fired. The conductivity of the second auxiliary thyratron AV2 is determined by the potential on the timing capacitor 73 in its control circuit which is plotted in curve 3f. As shown, this potential decays to a low negative value at an instant following the termination of the conductivity of the first auxiliary thyratron AV1; the potential rises to a substantial negative value when the first auxiliary thyratron AV1 becomes conductive. Thereafter, the second auxiliary thyratron AV2 is maintained non-conductive.

In curve 3g the sine wave represents the potential on the second main thyratron V2; the loops below the axis represent the potential of the capacitor supplied from the output transformer associated with the first thyratron and the distorted waves represent the potential derived from the auxiliary pulses. In this case negative potential is plotted downward. The capacitor (31) potential is shown to rise to a substantial negative value during the half period during which the first thyratron V1 is conductive, and to decay thereafter. When the first thyratron V1 becomes non-conductive, the negative potential decays to such an extent that the second thyratron V2 may be rendered conductive as shown.

Fig. 3 shows that the duration between the termination of the pulses supplied through the first thyratron V1 and the initiation of the pulses supplied through the second thyratron V2 is one cycle, and the interval between the termination of the supply of pulses through the second thyratron V2 and subsequent initiation of pulses through the first thyratron is also one cycle. Since each pulse produces conduction of current through the load during a complete cycle, a quiescent interval of one half cycle is thus interposed between each set of pulses. The system disclosed herein thus provides a minimum quiescent interval of one half period which is the same between all load pulses.

While I have shown and described a certain specific embodiment of my invention, I am fully aware that many modifications thereof are possible. My invention therefore is not to be restricted except insofar as is necessitated by the prior art and by the spirit of the appended claims.

I claim as my invention:

1. In combination, a first network including a first electric discharge valve adapted to produce pulses on a change in the conductivity of said valve; a second network including a second electric discharge valve adapted to produce pulses on a change in the conductivity of said second valve, said second valve being initially in non-pulse producing condition; a first control circuit for said second valve connected to said first network to respond to the pulses produced by said first network to condition said second valve to change its conductivity from non-pulse producing condition to pulse-producing condition, said control circuit including time delay means for delaying the instant when said second valve is conditioned as aforesaid by a first predetermined time interval after the initiation of pulses in said first network; and a second control circuit for said second valve also connected to said first network to respond to the pulses produced by said first network to permit said second valve to change its conductivity from non-pulse producing to its pulse-producing condition while conditioned as aforesaid; said second circuit including time delay means for delaying the instant when said second valve is in pulse-producing condition by a second predetermined time interval after the discontinuing of the pulses in said first network.

2. Apparatus for deriving from an alternating current supply pulses during selected half periods of said supply comprising, in combination, a first network, including a first electric discharge valve, adapted to produce pulses when the conductivity of said valve changes from a first condition to a second condition; a second network, including a second electric discharge valve, adapted to produce pulses when the conductivity of said second valve changes from a third condition to a fourth condition, said second valve being initially in non-pulse producing condition; a first control circuit for said second valve connected to said first network to respond to the pulses produced by said first network for conditioning the conductivity of said second valve to change from said third condition to said fourth condition, said control circuit including first time delay means for delaying the instant when said second valve is conditioned as aforesaid by a first predetermined time interval after the initiation of pulses in said first network; a second control circuit for said second valve also connected to said first network to respond to the pulses produced by said first network to permit the conductivity of said second valve to change from said third condition to said fourth condition when it is conditioned as aforesaid, said second circuit including second time delay means for delaying the instant when said second valve is changed to said fourth condition by a second predetermined interval after the discontinuing of pulses produced by said first network; and a third control circuit for said first valve connected to said first network to respond to said first network to change the conductivity of said first valve from said second condition to said first condition, said third circuit including said second time delay means for delaying said change from said second condition to said first condition.

3. In combination a first network, including a first electric discharge valve, for producing a pulse when the conductivity of said valve changes from a first condition to a second condition; a second network including a second electric discharge valve for producing a pulse when the conductivity of said second valve changes from a third condition to a fourth condition; a first control circuit for said first valve initially permitting said first valve to change from said first to said second condition of conductivity; a second control circuit for said second valve initially preventing said second valve from changing from said third to said fourth condition of conductivity; a first coupling circuit connected between said first network and said second circuit responsive to pulses produced by said first network for conditioning said second valve to change from said third condition to said fourth condition, said coupling circuit including time delay means for delaying the instant when said second valve is conditioned as aforesaid by a first predetermined time interval after the initiation of the pulses produced by said first network; a second coupling circuit connected between said first network and said first control circuit responsive to the pulses produced by said first network for causing said first valve to change from said second condition to said first condition and to remain in said first condition; and a third control circuit for said second valve connected to said first network to respond to the pulses produced by said first network, for permitting said second valve while conditioned as aforesaid to change from said third condition to said fourth condition, said third circuit including time delay means for delaying the instant when said second valve changes from said third condition to said fourth condition by a second predetermined time interval after said last-named pulses are discontinued.

4. In combination a first network, including a first electric discharge valve, adapted to produce a pulse when the conductivity of said valve changes from a first condition to a second condition; a second network including a second electric discharge valve for producing a pulse when the conductivity of said second valve changes from a third condition to a fourth condition; a first control circuit for said first valve initially permitting said first valve to change from said first to said second condition of conductivity; a second control circuit for said second valve initially preventing said second valve from changing from said third to said fourth condition of conductivity; a first coupling circuit connected between said first network and said second circuit and responsive to pulses produced by said first network for conditioning said second valve to change from said third condition to said fourth condition, said coupling circuit including time delay means for delaying the instant when said second valve is conditioned as aforesaid by a first predetermined time interval after the initiation of the pulses produced by said first network; a second coupling circuit connected between said first network and said first control circuit and responsive to the pulses produced by said first network for causing said first valve to change from said second condition to said first condition and to remain in said first condition; said second coupling circuit including time delay means for delaying the change from said first condition to said second condition for a second predetermined time interval after said first valve has changed to said second condition; and a third control circuit for said second valve connected to said first network, responsive to the pulses produced by said first network, for permitting said second valve while said second valve is conditioned as aforesaid to change from said third condition to said fourth condition, said third circuit including time delay means for delaying the instant when said second valve changes from said third condition to said fourth condition by a third predetermined time interval after said last-named pulses are discontinued.

5. Apparatus according to claim 4 characterized by the fact that the first and second coupling circuits include in common an electric discharge valve the conductivity of which is responsive to the pulses produced by said first network.

6. In combination a first network including a first thyratron, adapted to deliver a first main pulse when said first thyratron is rendered conductive; a second network, including a second thyratron adapted to deliver an auxiliary pulse when said second thyratron is rendered conductive; a third network, including a third thyratron, adapted to deliver a second main pulse when said third thyratron is rendered conductive; a first control circuit for said first thyratron initially permitting said first thyratron to become conductive; a second control circuit for said second thyratron initially preventing said second thyratron from becoming conductive; a third control circuit for said third thyratron connected to said second network and adapted to condition said third thyratron to become conductive when auxiliary pulses from said second network are delivered thereto; a coupling circuit for coupling said second control circuit to said first network and responsive to said first main pulses, for causing said second thyratron to become conductive, said coupling circuit including time delay means for delaying the instant when said second thyratron becomes conductive by a first predetermined time interval after the initiation of said first main pulses; a fourth control circuit for said third thyratron connected to said first network and responsive to said first main pulses for preventing said third thyratron from becoming conductive, even if said auxiliary pulses are delivered thereto, during the delivery of said first main pulses, said fourth circuit including time delay means for delaying the conduction of said third thyratron for a second predetermined time interval after said first main pulses are discontinued; and another coupling circuit between said first control circuit and said second network responsive to said auxiliary pulses for rendering said first thyratron non-conductive on the flow of said auxiliary pulses and for preventing said first thyratron again becoming conductive while said auxiliary pulses are flowing.

7. In combination a transformer having a pair of secondaries, one of said secondaries being adapted to be connected to a utilization circuit; an electric discharge valve having a control electrode and a cathode; a time constant network connected between said control electrode and cathode; and means including a rectifier for connecting said other secondary in parallel with said network.

8. In combination a thyratron having an anode, a cathode, a first grid and a second grid; means tending to maintain said thyratron non-conductive connected between said second grid and said cathode; means tending to counteract the effect of said maintaining means connected between said second grid and said cathode; a transformer having a utilization secondary and an auxiliary secondary; a time constant network connected between said first grid and said cathode and rectifier means connecting said auxiliary secondary to said network in such a sense that a potential across said secondary would tend to maintain said thyratron non-conductive in spite of the effect of said counteracting means.

9. A frequency determining circuit for a polyphase to single-phase converter for supplying current to a load comprising a first network for timing the flow of current of one polarity through said load; a second network for timing the flow of current of the opposite polarity through said load; and a control circuit between said first and said second networks responsive to the timing operation as aforesaid of said first network for initiating timing operation of said second network as aforesaid, said control circuit including a first timing circuit connected to condition said second network for a timing operation a first predetermined time interval after the timing operation of said first network starts; said frequency determining circuit being characterized by a control circuit which includes a second timing circuit which is connected to permit the timing operation of said second network, while conditioned as aforesaid, to start only after a second predetermined time interval after the timing operation of said first network has stopped.

10. In combination, a first electric discharge device having an anode, a cathode, and a control electrode; a first branch network connected in series with said anode and cathode; a second branch network connected in series with said anode and cathode; a first utilization circuit coupled to said first branch network; a first timing network; means for coupling said second branch network to said timing network for causing said timing network to time out on the initiation of conduction of said first device; means actuable by said timing network when it times out as aforesaid for preventing conduction of said first device; a second electric discharge device having an anode, a cathode, and a control electrode; a second utilization circuit coupled to the anode and cathode of said second device; a second timing network; means for connecting said second timing network to the control electrode of said second device; and means actuable by the conduction of said first device for actuating said second timing network to impress a blocking potential on the control electrode of said second device, said blocking potential decreasing to a non-blocking magnitude a predetermined time interval after said first device becomes non-conducting.

11. The combination according to claim 10 characterized by the fact that the means actuable by the conduction of the first device comprises coupling means between the first branch network and the timing network.

12. A frequency determining circuit for apparatus for deriving power from a source of commercial frequency and supplying it to a load at a lower frequency than that of the source and which circuit includes means for impressing pulses during a first interval to cause current of one polarity to flow from said source to said load during a half period of said low frequency, separate means for impressing pulses during a second interval to cause current of the opposite polarity to flow from said source to said load during a succeeding half period of said low frequency, and timing means for timing a third interval between said first and second intervals; said circuit being characterized by means responsive to the interruption of the impressing of said pulses during said first interval for initiating a timing operation of said timing means.

References Cited in the file of this patent

UNITED STATES PATENTS 2,263,773   Gulliksen _____ Nov. 25, 1941